UNITED STATES PATENT OFFICE.

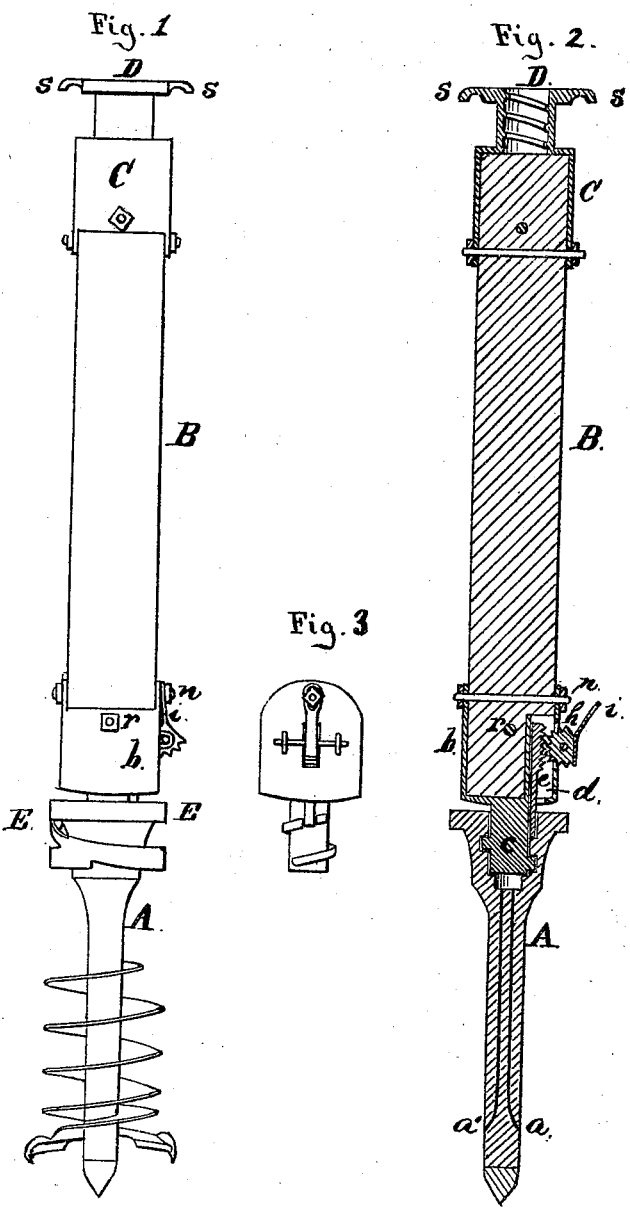

AUGUSTUS J. HEINE AND GEORGE HEINE, OF FREMONT, NEBRASKA.

IMPROVEMENT IN COUPLING DEVICES FOR EARTH-BORING AUGERS.

Specification forming part of Letters Patent No. 129,027, dated July 16, 1872.

*To all whom it may concern:*

Be it known that we, AUGUSTUS J. HEINE and GEORGE HEINE, of Fremont, in the county of Dodge and State of Nebraska, have invented a new and useful Improvement in Coupling-Shafts of Boring-Tools; and we do hereby declare that the following is a full, clear, and exact description of the construction and operation of the same, reference being had to the accompanying drawing making a part of this specification, in which—

Figure 1 is a side view. Fig. 2 is a longitudinal section; and Fig. 3, a view of the coupling device detached.

Like letters in the various figures of the drawing indicate like parts.

Our invention relates to the construction and combination of devices for coupling the shaft to a boring-tool or auger of the usual construction, having an air-chamber to prevent suction, as will be hereinafter more fully explained.

A is the boring-tool, with double air-chambers $a$ $a$ to prevent suction when withdrawing the tool; B, the shaft, arranged to fit in the socket formed by the metallic plates $b$, which terminate in a screw, $c$, made to fit and screw into the head of the tool A. To hold the shaft securely to the tool we make a recess, $d$, in the side of the shaft, extending from the bottom end thereof up to a suitable distance above. In this recess we arrange a ratchet-bolt, $e$, to connect with a gear-wheel, $h$, on the outside of the plate $b$ of the socket. This gear-wheel has its bearing on a shaft having a pivotal connection at each end with the plate of the socket. A lever, $i$, is attached to the edge of the gear-wheel, so that when screwing the shaft onto the head of the tool the lever $i$ is first pulled down to draw the bolt up, after which, when the shaft is screwed down as far as it will go, the lever is then pressed up, which forces the bolt through an opening in the bottom plate of the socket alongside of the screw $c$, and thence into a socket made in the head of the tool, thus rendering it impossible for the shaft to become uncoupled, the lever being held down by passing the bolt $n$ through its end, and thence through the socket and shaft, after which a screw-nut is placed over the end of the bolt. This bolt $n$ not only secures the lever, but also secures the shaft in the socket at the same time. The additional bolt $r$ is used on the other side of the shaft to strengthen its connection with the socket. The top of the shaft is inserted in a socket, C, of similar construction to the one below, and fastened to the same, but having, instead of a screw, a receptacle, D, provided with screw-threads on the interior to receive the screw of another section of the shaft. The top of the auger is provided with a guide, E, for keeping it in position when boring. The guide consists of two or more metallic bands, connected together and attached to the upper part of the auger in any suitable manner. The head of the auger, as will be seen, is enlarged, so as to form a receptacle, with screw-threads on the interior to receive the screw $c$ of the shaft, as hereinbefore described.

Having thus fully described our invention, what we claim therein as new, and desire to secure by Letters Patent, is—

The coupling device, consisting of screw $c$, ratchet-bolt $e$, gear-wheel $h$ with lever $i$, bolt $n$ in combination with shaft B, and tool or auger A having its head constructed to receive the screw and bolt, substantially as set forth.

As evidence that we claim the foregoing as our invention we have hereunto set our hands and seals this 18th day of March, 1872.

AUGUSTUS J. HEINE. [L. S.]
  GEORGE HEINE. [L. S.]

Witnesses:
  FREDERICK KYRISS,
  WILLIAM MARTIN.